(12) United States Patent
Zhang et al.

(10) Patent No.: US 11,149,621 B2
(45) Date of Patent: Oct. 19, 2021

(54) EXHAUST PIPE ASSEMBLY AND ENGINE

(71) Applicant: WEICHAI POWER CO., LTD., Weifang (CN)

(72) Inventors: Yangyang Zhang, Weifang (CN); Hongshuang He, Weifang (CN); Qingqing Zhang, Weifang (CN); Bin Hou, Weifang (CN); Feng Yun, Weifang (CN); Chao Rong, Weifang (CN)

(73) Assignee: WEICHAI POWER CO., LTD, Weifang (CN)

( * ) Notice: Subject to any disclaimer, the term of this patent is extended or adjusted under 35 U.S.C. 154(b) by 0 days.

(21) Appl. No.: 16/765,140

(22) PCT Filed: Dec. 28, 2017

(86) PCT No.: PCT/CN2017/119278
§ 371 (c)(1),
(2) Date: May 18, 2020

(87) PCT Pub. No.: WO2019/095515
PCT Pub. Date: May 23, 2019

(65) Prior Publication Data
US 2020/0340387 A1 Oct. 29, 2020

(30) Foreign Application Priority Data
Nov. 20, 2017 (CN) .......................... 201711157175.3

(51) Int. Cl.
*F01N 3/04* (2006.01)
*F01N 13/10* (2010.01)

(52) U.S. Cl.
CPC .............. *F01N 13/10* (2013.01); *F01N 3/043* (2013.01); *F01N 3/046* (2013.01); *F01N 13/107* (2013.01)

(58) Field of Classification Search
CPC ........ F01N 13/08; F01N 13/10; F01N 13/102; F01N 13/082; F01N 13/107;
(Continued)

(56) References Cited

U.S. PATENT DOCUMENTS

| 5,109,668 A | 5/1992 | Lindstedt |
| 5,148,675 A | 9/1992 | Inman |

(Continued)

FOREIGN PATENT DOCUMENTS

| CN | 200958412 | 10/2007 |
| CN | 101294509 | 10/2008 |

(Continued)

OTHER PUBLICATIONS

International Search Report dated Aug. 20, 2018 in International Patent Application No. PCT/CN2017/119278, pp. 1-4.
(Continued)

*Primary Examiner* — Audrey B. Walter
*Assistant Examiner* — Dapinder Singh
(74) *Attorney, Agent, or Firm* — Byrne Poh LLP

(57) ABSTRACT

An exhaust pipe assembly includes: an exhaust cavity; an exhaust port (234) and at least two air inlets (115) communicating with the exhaust cavity, the exhaust port (234) being disposed at an end of the exhaust pipe assembly; and a water inlet (114), a first part of a water inlet cavity (111), a second part of a water inlet cavity, a water counterflow cavity, and a water outlet (311) that are provided in the exhaust pipe assembly. The water inlets (114) are provided in the same number as the air inlets (115). The first part of the water inlet cavity (111) communicates with the first water inlet portion (114). The second part of the water inlet cavity communicates with the second water inlet portion (114). The water counterflow cavity communicates with the end of the second part of the water inlet cavity located at the exhaust port (234)
(Continued)

of the exhaust pipe assembly. The water outlet (311) is disposed at a second end of the exhaust pipe assembly. The first part of the water inlet cavity (111) and the water counterflow cavity each communicate with the water outlet (311).

20 Claims, 10 Drawing Sheets

(58) Field of Classification Search
CPC .... F01N 13/105; F01N 13/1805; F01N 3/043; F01N 3/046; F01N 2590/02; Y02T 10/12
USPC .................................................. 60/320, 321
See application file for complete search history.

(56) References Cited

U.S. PATENT DOCUMENTS

| | | | | |
|---|---|---|---|---|
| 5,860,278 | A * | 1/1999 | Rodenkirch | ............ F01N 13/10 60/313 |
| 2007/0105465 | A1* | 5/2007 | Wolfsgruber | .... F02M 35/10039 440/88 R |
| 2008/0083216 | A1* | 4/2008 | Claudinon | ............ F01N 13/102 60/320 |
| 2016/0348564 | A1* | 12/2016 | Maloney | ............. F01N 13/1827 |
| 2017/0248064 | A1* | 8/2017 | Kudo | ......................... F02F 1/40 |

FOREIGN PATENT DOCUMENTS

| | | |
|---|---|---|
| CN | 102251839 | 11/2011 |
| CN | 203098011 | 7/2013 |
| CN | 203114393 | 8/2013 |
| CN | 203570404 | 4/2014 |
| CN | 204060886 | 12/2014 |
| CN | 104612790 | 5/2015 |
| CN | 104895659 | 9/2015 |
| CN | 205605283 | 9/2016 |
| CN | 105986873 | 10/2016 |
| CN | 106194376 | 12/2016 |
| CN | 206111312 | 4/2017 |
| DE | 3114404 | 11/1982 |
| JP | 5992356 | 9/2016 |

OTHER PUBLICATIONS

Office Action dated Jan. 10, 2020 in CN Patent Application No. 201711157175.3, pp. 1-4.
Office Action dated Jul. 4, 2020 in CN Patent Application No. 201711157175.3, pp. 1-3.

* cited by examiner

EXHAUST PIPE ASSEMBLY AND ENGINE

CROSS-REFERENCE TO RELATED APPLICATIONS

This application is a United States national stage application of co-pending International Patent Application Number PCT/CN2017/119278, filed on Dec. 28, 2017, which claims the priority of Chinese patent application No. 201711157175.3 entitled "EXHAUST PIPE ASSEMBLY AND ENGINE" and filed on Nov. 20, 2017 with China National Intellectual Property Administration, disclosures of which are incorporated herein by reference in their entireties.

TECHNICAL FIELD

The present disclosure relates to the field of engine manufacturing, for example, to an exhaust pipe assembly and an engine.

BACKGROUND

In some special fields, multiple pipes of the engine need to be protected, thus making the temperature of the engine meet the requirements. For example, absent any protection, exhaust pipes used for engines of marine or naval vessels, the temperature of the pipes would be so high that people cannot get close. Therefore, in the ship regulations, the surface temperature of the pipe needs to be lower than 220 degrees Celsius.

In the related art, a heat insulating material with very poor thermal conductivity is usually wrapped on the outer surface of the exhaust pipe, so that the exhaust pipe is separated from the outside world by the heat insulating material thereby indirectly reducing the surface temperature of the pipe. However, heat insulating materials are prone to problems such as cracking and falling off during long-term use, resulting in poor reliability and durability of this solution. In addition, covering the whole outer surface of the exhaust pipe with heat insulating materials would amount to occupation of a relatively large space, and may also compromising the aesthetics of the appearance.

A water jacket exhaust pipe solution is also used in the art. The water jacket completely or partially wraps around the outer surface of the pipe, and the engine coolant is used to remove the heat of the high-temperature exhaust thus reducing the outer surface temperature of the pipe. Typical water jacket exhaust pipe solutions however have following potential problems. First, in typical water jackets the water is only able to flow in one direction through the exhaust pipe, so that a water counterflow pipeline needs to be separately designed to create an engine coolant circulation. As such, extra components need to be arranged requiring extra space, leading to unsatisfactory compactness and unattractive appearance. Second, the purpose of the water jacket exhaust pipe is to reduce the surface temperature rather than cooling, when all the engine coolant flows through the water jacket, too much heat may be taken away while a pressure drop of a coolant circuit may be increased, which may directly lead to ineffective loss of heat and may also indirectly lead to power increase of the water pump, increasing the power consumption of the engine.

SUMMARY

The present disclosure provides an exhaust pipe assembly, which solves the problem that the water jacket exhaust pipe in the related art is not compact in structure.

The present disclosure further provides an engine, which solves a problem that the water jacket exhaust pipe assembly of the engine in the related art is not compact in structure.

There is provided an exhaust pipe assembly that includes:
an exhaust cavity;
an exhaust port that is in communication with the exhaust cavity;
at least two air inlets that are in communication with the exhaust cavity, the exhaust port being disposed at a first end of the exhaust pipe assembly;
a plurality of water inlets, provided in the same number as the at least two air inlets;
a first water inlet cavity, which is in communication with a first portion of the water inlets;
a second water inlet cavity, which is in communication with a second portion of the water inlets;
a water counterflow cavity, which is communicate with one end of the second water inlet cavity located at the exhaust port of the exhaust pipe assembly; and
a water outlet, which is located at a second end of the exhaust pipe assembly;
where the first water inlet cavity and the water counterflow cavity are both in communication with the water outlet.

An engine includes an exhaust pipe assembly.
The exhaust pipe assembly includes:
an exhaust cavity;
an exhaust port, communicating with the exhaust cavity;
at least two air inlets, communicating with the exhaust cavity, wherein the exhaust port is disposed at a first end of the exhaust pipe assembly;
a plurality of water inlets, provided in the same number as the at least two air inlets;
a first water inlet cavity, communicating with a first portion of the water inlets;
a second water inlet cavity, communicating with a second portion of the water inlets;
a water counterflow cavity, communicating with one end of the second water inlet cavity located at the exhaust port of the exhaust pipe assembly; and
a water outlet, disposed at a second end of the exhaust pipe assembly;
where the first water inlet cavity and the water counterflow cavity each communicate with the water outlet.

The exhaust pipe assembly of the present disclosure enables the split-cavity and split-flow exhaust pipe assembly to have the dual function of water intake and water return, achieving the purpose of cavity splitting and improving compactness of the engine. Cooling water or coolant that enters the exhaust pipe through part of the water inlets is directly discharged through the water outlet to achieve the purpose of flow splitting, thereby achieving the purpose of effectively cooling the surface of the split-cavity and split-flow exhaust pipe assembly.

| Reference Signs: | |
|---|---|
| 1. Exhaust pipe A | 111. Inlet cavity A |
| 112. Water counterflow cavity A | 113. Exhaust cavity A |
| 114. Water inlet | 115. Air inlet |
| 2. Exhaust pipe B | 21. First exhaust pipe |
| 211. First water inlet cavity | 212. First water counterflow cavity |
| 213. First exhaust cavity | 22. Second exhaust pipe |
| 221. Second water inlet cavity | 222. Second water counterflow cavity |
| 223. Second exhaust cavity | 23. Third exhaust pipe |
| 231. Third water inlet cavity | 232. Third water counterflow cavity |
| 233. Third exhaust cavity | 234. Exhaust port |
| 3. Water outlet connector | 311. Water outlet |

DETAILED DESCRIPTION

Figure 1:
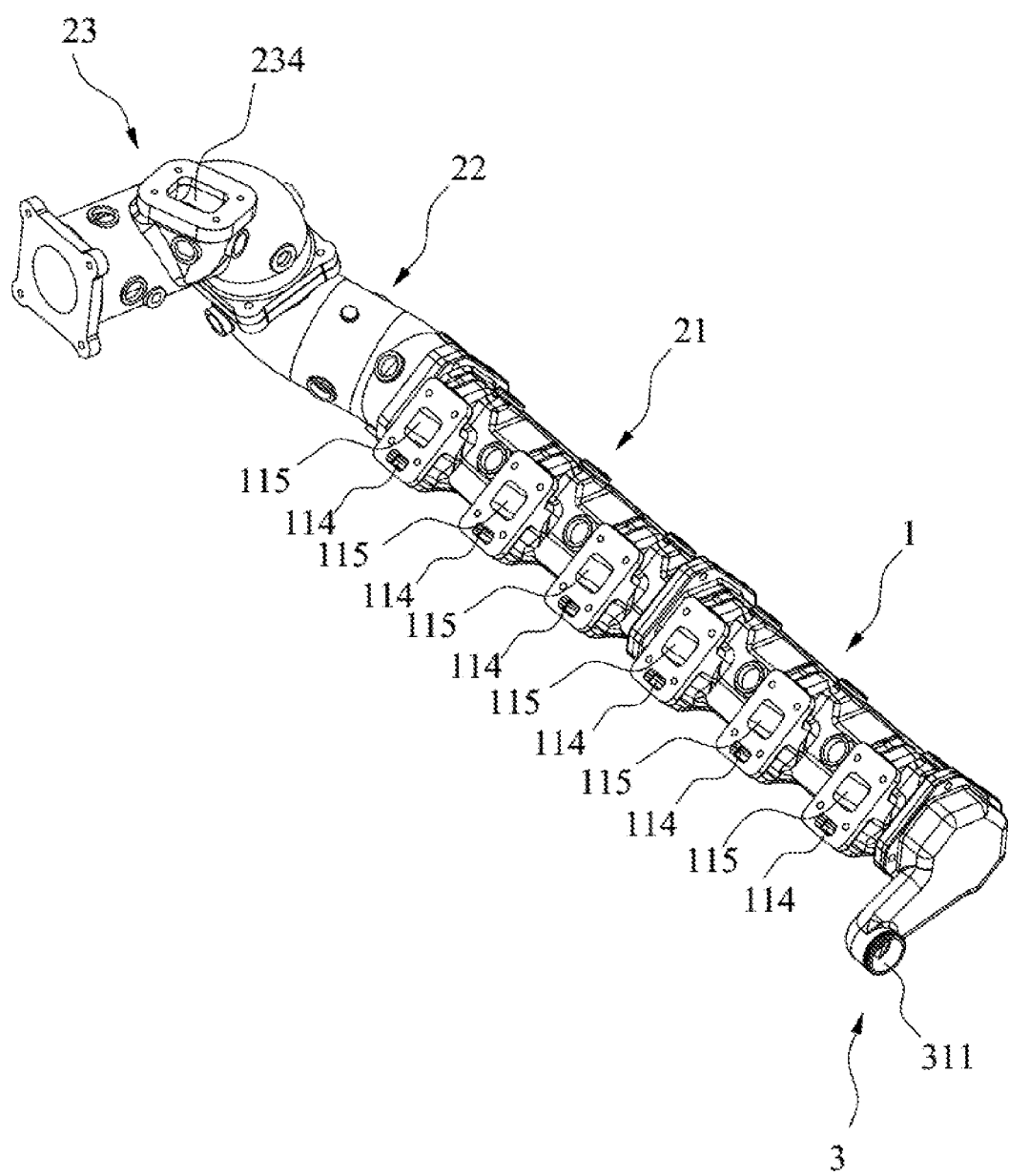
FIG. 1 is a schematic view illustrating a split-cavity and split-flow exhaust pipe assembly in an embodiment according to the present disclosure.
Figure 2:
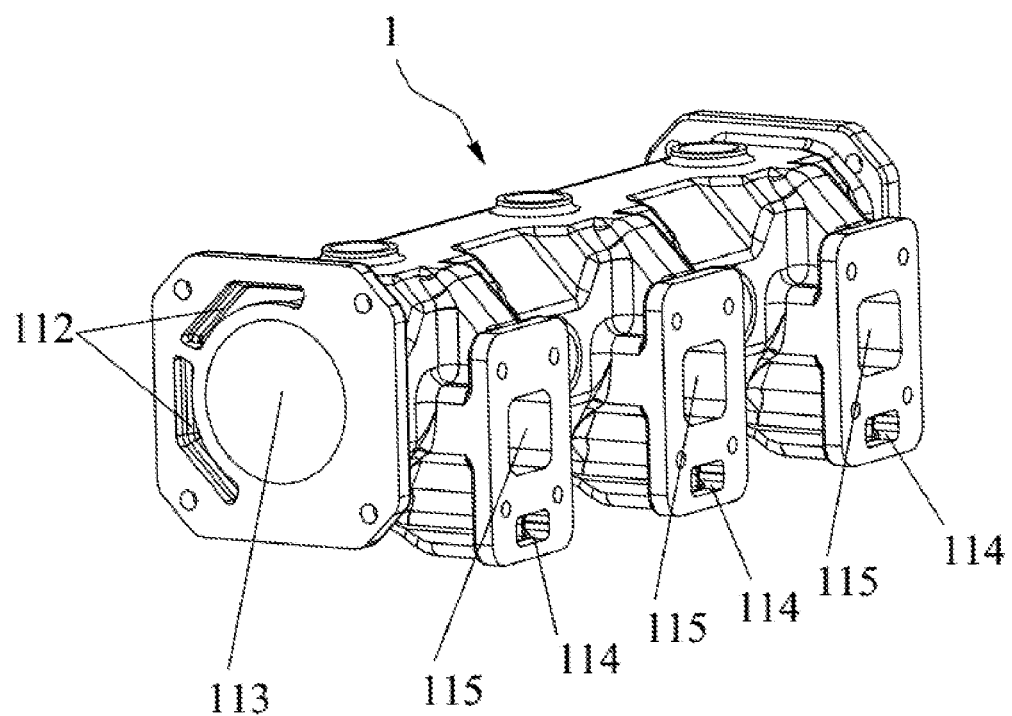
FIG. 2 is a schematic view illustrating a first exhaust pipe 1 in the split-cavity and split-flow exhaust pipe shown in FIG. 1.
Figure 3:
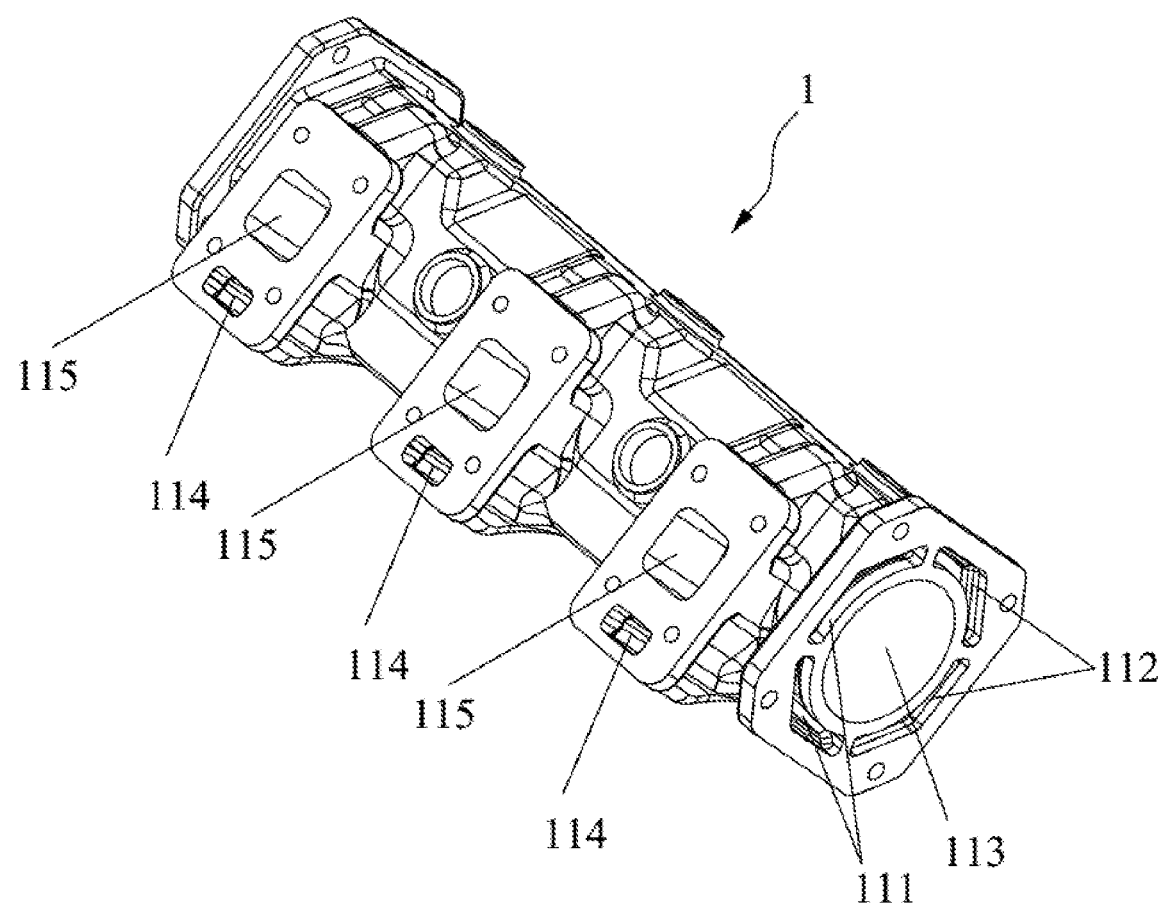
FIG. 3 is a schematic view of another perspective illustrating the first exhaust pipe 1 in the split-cavity and split-flow exhaust pipe shown in FIG. 1.
Figure 4:
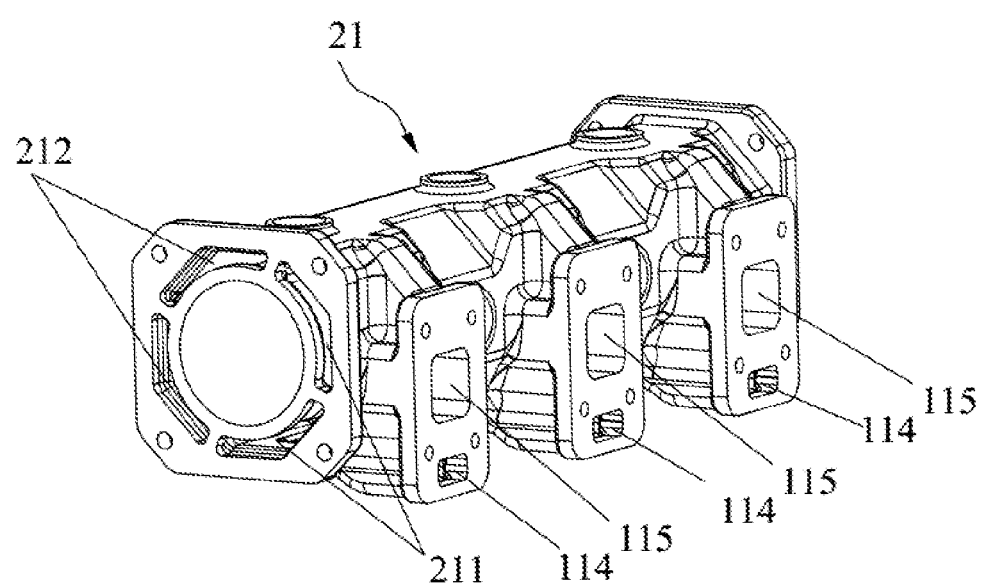
FIG. 4 is a schematic view illustrating a first exhaust pipe segment in the split-cavity and split-flow exhaust pipe shown in FIG. 1.
Figure 5:
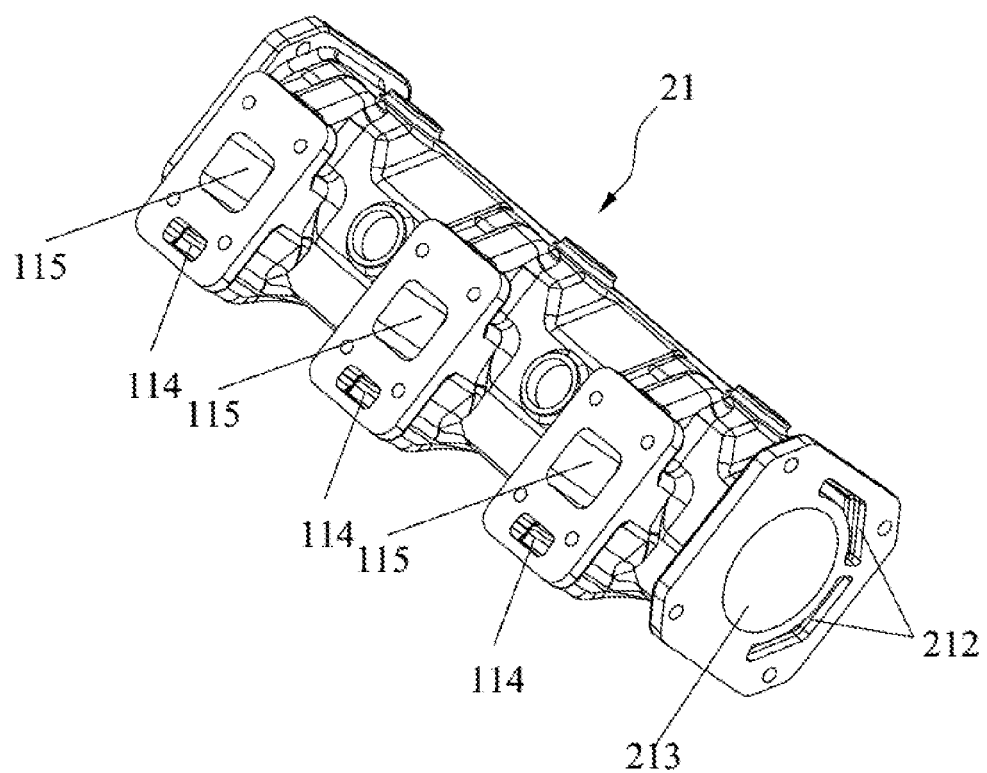
FIG. 5 is a schematic view of another perspective illustrating the first exhaust pipe segment in the split-cavity and split-flow exhaust pipe shown in FIG. 1.
Figure 6:
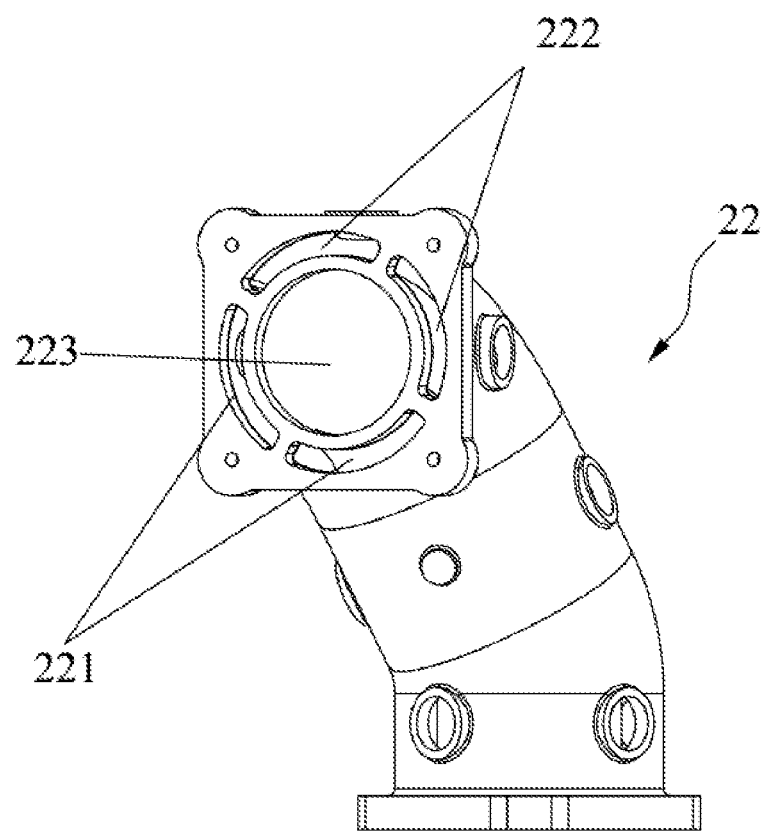
FIG. 6 is a schematic view illustrating a second exhaust pipe segment in the split-cavity and split-flow exhaust pipe shown in FIG. 1.
Figure 7:
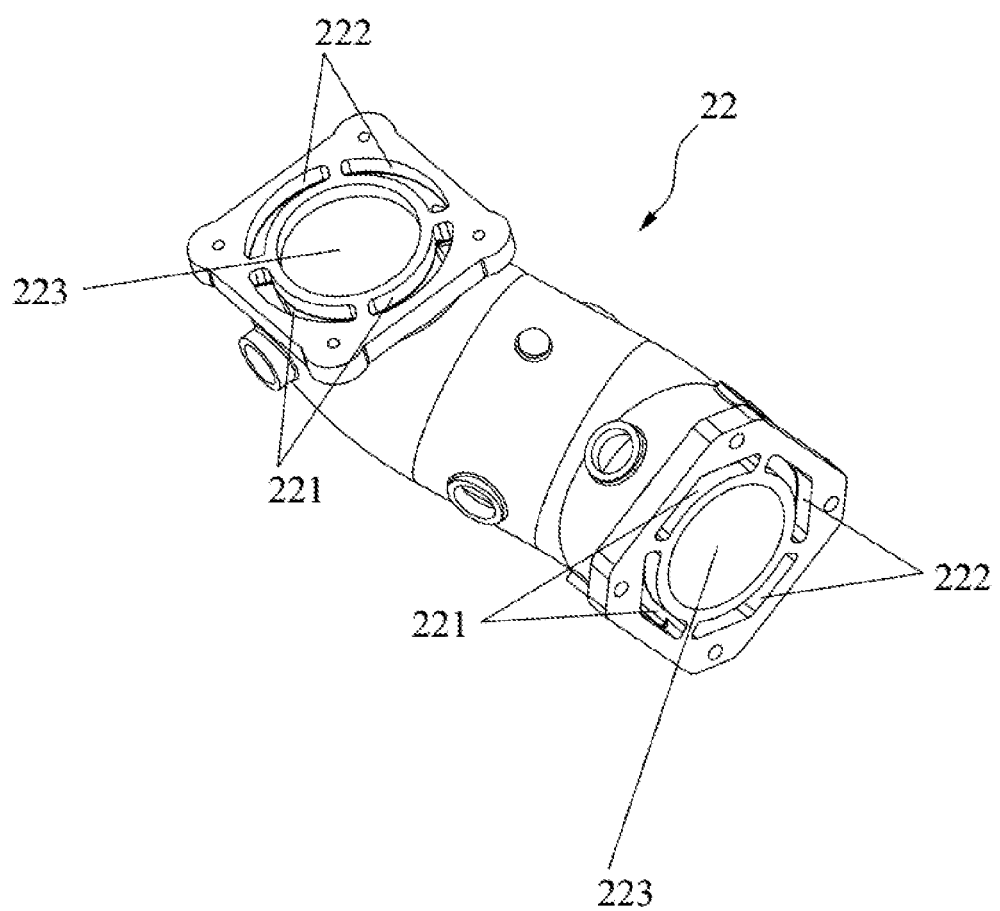
FIG. 7 is a schematic view of another perspective illustrating the second exhaust pipe segment in the split-cavity and split-flow exhaust pipe shown in FIG. 1.
Figure 8:
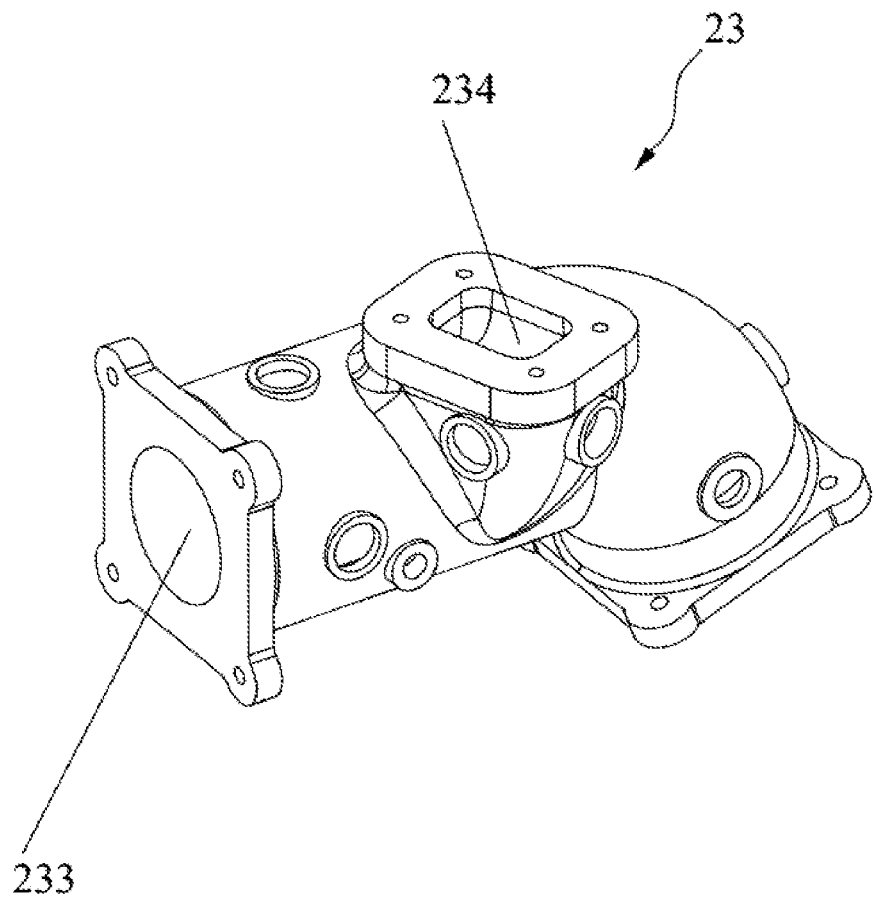
FIG. 8 is a schematic view illustrating a third exhaust pipe segment in the split-cavity and split-flow exhaust pipe shown in FIG. 1.
Figure 9:
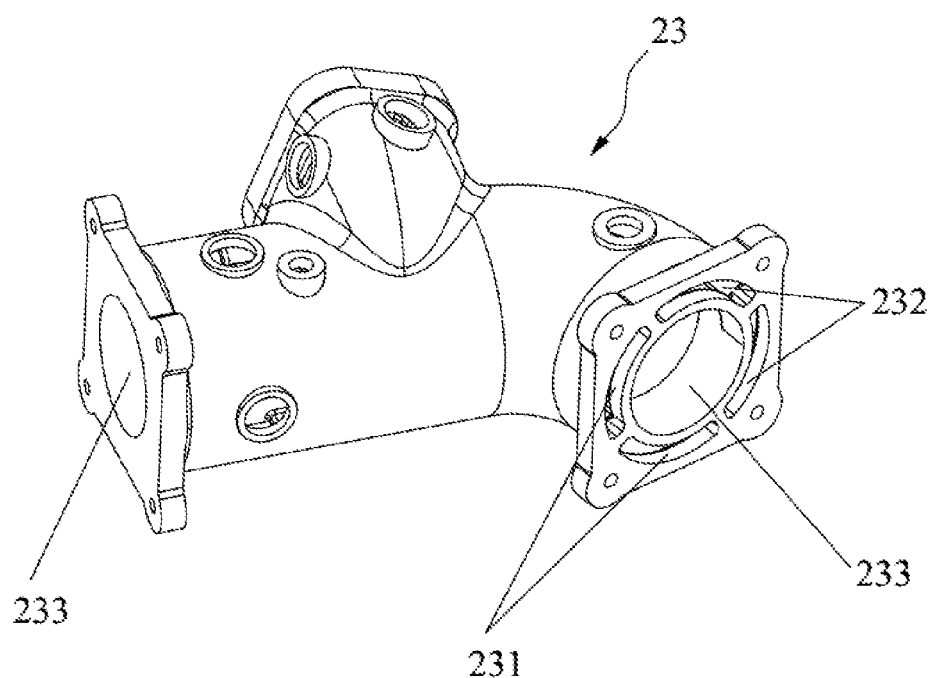
FIG. 9 is a schematic view of another perspective illustrating the third exhaust pipe segment in the split-cavity and split-flow exhaust pipe shown in FIG. 1.
Figure 10:
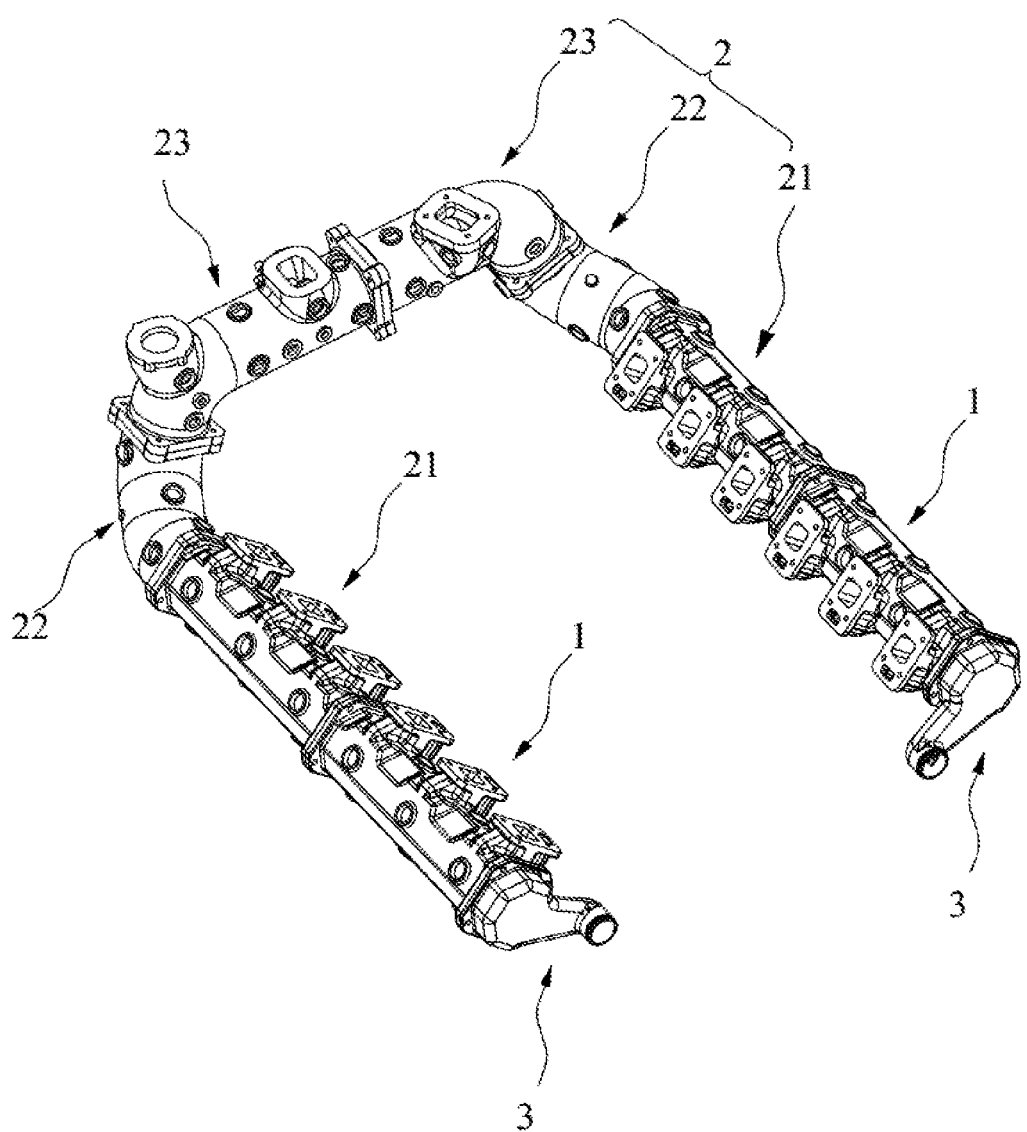
FIG. 10 is a schematic view illustrating a split-cavity and split-flow exhaust pipe assembly in a V12 engine in an embodiment according to the present disclosure.

The present embodiment provides an exhaust pipe assembly, as illustrated in FIGS. 1 to 10, the exhaust pipe assembly is provided with an exhaust cavity, air inlets 115, water inlets 114, a first water inlet cavity 111, and a second water inlet cavity, a water counterflow cavity, a water outlet 311 and an exhaust port 234. In the present embodiment, the exhaust pipe assembly is a split-cavity split-flow exhaust pipe assembly, where a number of the air inlets 115 is identical as that of the water inlets 114, and the number is not less than two, each of the air inlets 115 is in communication with the exhaust cavity, a first portion of the water inlets 114 is in communication with the first water inlet cavity 111, a second portion of the water inlets 114 is in communication with the second water inlet cavity, the air outlet 234 is arranged at a first end of the exhaust pipe assembly, the water outlet 311 is arranged at a second end of the exhaust pipe assembly, the exhaust port 234 is adjacent to the second water inlet cavity and is in communication with the exhaust cavity, the water outlet 311 is adjacent to the first water inlet cavity 111, and is in communication with the first water inlet cavity 111 and the water counterflow cavity, and the second water inlet cavity is in communication with water counterflow cavity at an end of the exhaust pipe assembly adjacent to the exhaust port 234. In the present embodiment, by dividing the water inlet 114 into two portions, and the first portion of the water inlets 114 is in communication with the first water inlet cavity 111, the second portion of the water inlets 114 is in communication with the second water inlet cavity, and liquid flowing into the first water inlet cavity 111 and the second water inlet cavity respectively reach the water outlet 311 through different circulating water channels. In the present embodiment, the liquid flowing into the first water inlet cavity 111 and the second water inlet cavity may be cooling water or a coolant, so as to realize a split-flow design of the water channel. By making the first water inlet cavity 111 directly in communication with the water outlet 311, the second water inlet cavity is firstly in communication with the water counterflow cavity at an end adjacent to the exhaust port 234, and then in communication with the water outlet 311 through the water counterflow cavity. The exhaust pipe assembly is designed with a water inlet channel and a water return channel at the same time, which realizes a split-cavity structure of the water channel and avoids a design of an additional water return pipe, making the exhaust pipe assembly more compact and attractive.

In the present embodiment, the water outlet 311 is used to connect to a front end pipeline of an water pump of an engine, the exhaust port 234 is used to connect to an inlet end of a supercharger, and the water inlet 114 is used to connect to a water outlet on an cylinder head of the engine, and the air inlet 115 is used to connect to an exhaust port on the cylinder head of the engine. In the present embodiment, the first water inlet cavity 111 and the second water inlet cavity are located on a first side of the exhaust pipe assembly, and the water counterflow cavity is located on a second side of the exhaust pipe assembly.

Optionally, the exhaust pipe assembly in the present embodiment includes a water outlet connector 3, a first exhaust pipe 1, and a second exhaust pipe 2 that are sequentially in communication. The second exhaust pipe 2 includes a first exhaust pipe segment 21, a second exhaust pipe segment 22, and a third exhaust pipe segment 23. Where the water outlet 311 is provided on the water outlet connector 3, the first portion of the water inlets 114 and the first water inlet cavity 111 are both provided on the first exhaust pipe 1, and the second portion of the water inlets 114 is provided on the first exhaust pipe segment 21. The second water inlet cavity includes a first water inlet cavity 211 provided on the first exhaust pipe segment 21, a second water inlet cavity 221 provided on the second exhaust pipe segment 22, and a third water inlet cavity 231 provided on the third exhaust pipe segment 23, and the first water inlet cavity 211, the second water inlet cavity 221, and the third water inlet cavity 231 are in communication with each in sequence.

The water counterflow cavity includes a fourth water counterflow cavity 112 provided on the first exhaust pipe 1, a first water counterflow cavity 212 provided on the first exhaust pipe segment 21, a second water counterflow cavity 222 provided on the second exhaust pipe segment 22 and a third water counterflow cavity 232 provided on the third exhaust pipe segment 23, where the fourth water counterflow cavity 112, the first water counterflow cavity 212, the second water counterflow cavity 222 and the third water counterflow cavity 232 are in communication with each other in sequence.

The third water inlet cavity 231 and the third water counterflow cavity 232 are in communication with each other at an end of the third exhaust pipe segment 23 facing away from the first exhaust pipe segment 21. The first water inlet cavity 111 and the fourth water counterflow cavity 112 are in communication with the water outlet 311.

The exhaust cavity includes a first exhaust cavity 113 provided in the first exhaust pipe 1, and a second exhaust cavity comprising a first exhaust cavity segment 213 provided in the first exhaust pipe segment 21, a second exhaust cavity segment 223 provided in the second exhaust pipe segment 22, and a third exhaust cavity segment 233 provided in the third exhaust pipe segment 23. The first exhaust cavity 113, the first exhaust cavity segment 213, the second exhaust cavity segment 223 and the third exhaust cavity segment 233 are in communication in sequence. The first portion of the air inlets 115 is provided on the first exhaust pipe 1 and is in communication with the first exhaust cavity 113, the second portion of the air inlets 115 is provided on the first exhaust pipe segment 21 and is in communication with the first exhaust cavity segment 213, and the first exhaust cavity segment 213 is in communication with the first exhaust cavity 113.

In the present embodiment, a number of the first portion of the air inlets 115 is identical as that of the first portion of the water inlets 114; and a number of the second portion of the air inlets 115 is identical as that of the second portion of the water inlets 114.

The exhaust port 234 is arranged on an end of the third exhaust pipe segment 23 facing away from the first exhaust pipe segment 21, and in communication with the third exhaust cavity segment 233.

Optionally, the second exhaust pipe segment 22 is an elbow.

Optionally, the water outlet connector 3, the first exhaust pipe 1, the first exhaust pipe segment 21, the second exhaust pipe segment 22, and the third exhaust pipe segment 23 are directly connected in sequence through end faces, and sealed at connection positions. Optionally, a first end of the first exhaust pipe 1 is connected to a first end of the water outlet connector 3, a second end of the first exhaust pipe 1 is connected to a first end of the first exhaust pipe segment 21, a first end of the second exhaust pipe segment 22 is connected to a second end of the first exhaust pipe segment 21, and a second end of the second exhaust pipe segment 22 is connected to an end of the third exhaust pipe segment 23. The first water inlet cavity 211, the second water inlet cavity 221 and the third water inlet cavity 231 may also be connected by way of a water bridge. Optionally, a connection hole that is in communication with the first water inlet cavity 211 is openly provided in a side wall of the first exhaust pipe segment 21 adjacent to an end of the second exhaust pipe segment 22, connection holes that are in communication with the second water inlet cavity 221 are respectively openly provided on side walls of the second exhaust pipe segment 22 adjacent to both ends of the second exhaust pipe segment 22, and a connection hole that is in communication with the third water inlet cavity 231 is openly provided on an end of the third exhaust pipe segment 23 adjacent to the second exhaust pipe segment 22, where two adjacent connection holes are connected by a water pipe. Similarly, the third water counterflow cavity 232, the second water counterflow cavity 222, the first water counterflow cavity 212, and the fourth water counterflow cavity 112 may also be connected by way of the water bridge.

The exhaust cavity in the present embodiment is located in a middle position of the exhaust pipe assembly, the first water inlet cavity 111, the first water inlet cavity 211, the second water inlet cavity 221, and the third water inlet cavity 231 are located on a first side of the exhaust pipe assembly, the third water counterflow cavity 232, the second water counterflow cavity 222, the first water counterflow cavity 212, and the fourth water counterflow cavity 112 are located on a second side of the exhaust pipe assembly, a water interaction port (not shown in the drawings) is provided on an end of the third exhaust pipe segment 23 facing away from the second exhaust pipe segment 22, and the third water counterflow cavity 232 is in communication with the third water inlet cavity 231 through the water interaction port, so that the second water inlet cavity and the water counterflow cavity form a U-shaped pipeline structure. On this basis, in view that the first water inlet cavity 111 may efficiently take away surface heat of the exhaust pipe assembly, thereby improving the heat dissipation effect on the surface of the exhaust pipe assembly.

In the present embodiment, the first exhaust pipe segment 21, the second exhaust pipe segment 22, and the third exhaust pipe segment 23 may adopt a separated structure, which is convenient for segmented processing; or may be an integral structure, when adopted, which may save a step of segmented assembling, and has no connection portion between segments, making water and air leakage not easy to occur; the second exhaust pipe 22 segment may also be discarded, so that the first exhaust pipe 21 segment and the third exhaust pipe 23 segment are directly connected; and the second exhaust pipe segment 22 may also be split into more segments, so that each segment has an arbitrary length, and an arbitrary shape. Certainly, the first exhaust pipe 1 in the present embodiment may also be split into more segments in a style of the second exhaust pipe 2. An appropriate structure may be selected according to a specific shape of the engine.

Paths of exhaust and water draining in the present embodiment are as follows.

A part of the exhaust enters the first exhaust cavity 113 through the first portion of the air inlets 115, and another part of the exhaust enters the first exhaust cavity segment 213 through the second portion of the air inlets 115, the exhaust sequentially flows along a path of the first exhaust cavity 113, the first exhaust cavity segment 213, the second exhaust cavity segment 223 and the third exhaust cavity segment 233, and is finally discharged through the exhaust port 234. A part of the water or coolant enters the first water inlet cavity 111 through the first portion of the water inlets 114, and is directly discharged from the first water inlet cavity 111 through the water outlet 311. Another part of the water or coolant enters the first water inlet cavity 211 through the second portion of the water inlets 114, then sequentially pass through the first water inlet cavity 211, the second water inlet cavity 221, the third water inlet cavity 231, the water interaction port, the third water counterflow cavity 232, the second water counterflow cavity 222, the first water counterflow cavity 212 and the fourth water counterflow cavity 112, and are discharged when finally reach the water outlet 311.

On the other hand, the present embodiment provides an engine including the above-mentioned split-cavity and split-flow exhaust pipe assembly. The engine includes at least one group of cylinders, and a number of cylinders in each group is at least two. A number of cylinders in each group of cylinders is identical as a number of air inlets 115 and a number of water inlets 114 of the split-cavity and split-flow exhaust pipe assembly, and each cylinder of an identical group is connected to the water inlet 114 and the water outlet in one-to-one correspondence. For example, when the engine is a V12-type engine, the engine includes two groups of cylinders, each cylinder in each group is connected to a split-cavity and split-flow exhaust pipe assembly, and a number of cylinders in each group is six, where three of the six cylinders are connected to three air inlets 115 and three water inlets 114 on the first exhaust pipe 1, and another three of the six cylinders are connected to three air inlets 115 and three water inlets 114 on the first exhaust pipe segment 21. Certainly, the above six cylinders may also be divided into two parts, where each part includes an arbitrary number of cylinders, where the arbitrary number is at least one.

Optionally, the water outlet and the exhaust port are provided on an end cover of each cylinder, the water outlet on the end cover is connected to the water inlet 114 on the exhaust pipe assembly, and the exhaust port on the end cover is connected to the air inlet 115 on the exhaust pipe assembly.

Optionally, when the engine is a V-type engine, end surfaces of each end of the two third exhaust pipes segment 23 provided with the exhaust port 234 are directly connected and sealed, and the two third exhaust cavities segment 233 are in communication with each other.

In the present embodiment, the second water inlet cavity and the water counterflow cavity are provided on the split-cavity and split-flow exhaust pipe assembly, so that the cooling water or coolant entering the exhaust pipe from the second portion of the water inlets 114 passes through the second water inlet cavity and the water counterflow cavity and is discharged through the water outlet 311, so that the split-cavity and split-flow exhaust pipe assembly has both functions of water inlet and water return, achieving a purpose of splitting the cavity, making the overall design of the exhaust pipe assembly more compact, reducing redundant design for peripheral pipelines, thereby reducing space occupation, while making the overall structure more attractive. Optionally, by providing the first water inlet cavity 111 on the split-cavity and split-flow exhaust pipe assembly, and making the water or coolant enter the exhaust pipe from the first portion of the water inlets 114 directly discharged through the water outlet 311, thereby achieving the purpose of splitting flow, as well as effectively cooling the surface of the split-cavity and split-flow exhaust pipe assembly. At the same time, for the V-type engine, the water or coolant passing through the single exhaust pipe 1 or the second exhaust pipe 2 merely accounts for 25% or less of the water pump of the engine, which may ensure a maximum possible reduction of heat loss and pressure drop of cooling water or coolant along the path on a premise of a smallest volume of the exhaust pipe assembly, so that the thermal efficiency of the engine is improved, the fuel consumption of the engine is reduced, and requirements for performance of the pump are reduced, making overall performance superior.

INDUSTRIAL APPLICABILITY

An exhaust pipe assembly of the present disclosure realizes the dual function of splitting cavity and splitting flow, making the design of the exhaust pipe assembly more compact.

What is claimed is:

1. An exhaust pipe assembly, comprising:
an exhaust cavity;
an exhaust port, communicating with the exhaust cavity;
at least two air inlets, communicating with the exhaust cavity, wherein the exhaust port is disposed at a first end of the exhaust pipe assembly;
a plurality of water inlets, provided in the same number as the at least two air inlets;
a first water inlet cavity, communicating with a first portion of the water inlets;
a second water inlet cavity, communicating with a second portion of the water inlets;
a water counterflow cavity, communicating with an end of the second water inlet cavity located at the exhaust port of the exhaust pipe assembly; and
a water outlet, disposed at a second end of the exhaust pipe assembly;
wherein the first water inlet cavity and the water counterflow cavity each communicate with the water outlet.

2. The exhaust pipe assembly of claim 1, further comprising a water outlet connector, wherein a second exhaust pipe, a first exhaust pipe, and the water outlet connector are sequentially connected;
the water outlet is provided in the water outlet connector; the first portion of the water inlets and the first water inlet cavity are provided in the first exhaust pipe; the second portion of the water inlets and the second water inlet cavity are provided in the second exhaust pipe; and
the water counterflow cavity comprises a first part of the water counterflow cavity provided in the first exhaust pipe and a second part of the water counterflow cavity provided in the second exhaust pipe, where the first part of the water counterflow cavity communicates with the second part of the water counterflow cavity.

3. The exhaust pipe assembly of claim 2, wherein the exhaust port is disposed at an end of the second part of the exhaust pipe facing away from the first exhaust pipe; the exhaust cavity comprises a first exhaust cavity provided in the first exhaust pipe and a second exhaust cavity provided in the second exhaust pipe, wherein the first exhaust cavity communicates with the second exhaust cavity, and the exhaust port communicates with the second exhaust cavity;
a first portion of the air inlets are provided in the first exhaust pipe and communicate with the first exhaust cavity, and a second portion of the air inlets are provided in the second exhaust pipe and communicate with the second exhaust cavity, wherein the first portion of the air inlets are provided in the same number as the first portion of the water inlets, and the second portion of the air inlets are provided in the same number as the second portion of the water inlets.

4. The exhaust pipe assembly of claim 3, wherein a first end of the first exhaust pipe is hermetically connected to an end of the second exhaust pipe, and a second end of the first exhaust pipe is hermetically connected to an end of the water outlet connector.

5. The exhaust pipe assembly of claim 4, wherein the second exhaust pipe is of an integral structure.

6. The exhaust pipe assembly of claim 4, wherein the second exhaust pipe comprises a first exhaust pipe segment and a third exhaust pipe segment connected to each other, wherein the first exhaust pipe segment is hermetically connected to the first exhaust pipe;
the second portion of the water inlets are provided in the first exhaust pipe segment; the second water inlet cavity comprises a first water inlet cavity segment provided in the first exhaust pipe segment and a third water inlet cavity segment provided in the third exhaust pipe segment, wherein the second portion of the water inlets each communicate with the first water inlet cavity segment, and the first water inlet cavity segment communicate with the third water inlet cavity segment;
the second part of the water counterflow cavity comprises a first water counterflow cavity provided in the first exhaust pipe segment and a third water counterflow cavity provided in the third exhaust pipe segment, wherein the first water counterflow cavity communicates with the third water counterflow cavity, and the first water counterflow cavity communicates with the first part of the water counterflow cavity; and the third water inlet cavity segment communicates with the third water counterflow cavity at end of the third exhaust pipe segment facing away from the first exhaust pipe segment.

7. The exhaust pipe assembly of claim 6, wherein the second portion of the air inlets are provided in the first exhaust pipe segment; the second exhaust cavity comprises a first exhaust cavity segment provided in the first exhaust pipe segment and a third exhaust cavity segment provided in the third exhaust pipe segment, wherein the first exhaust cavity segment communicates with the third exhaust cavity segment, the second portion of the air inlets each communicate with the first exhaust cavity segment, and first exhaust cavity segment communicates with the first exhaust cavity; and the exhaust port is arranged at the end of the third exhaust pipe segment facing away from the first exhaust pipe segment, and communicates with the third exhaust cavity segment.

8. The exhaust pipe assembly of claim 7, wherein the second exhaust pipe further comprises a second exhaust pipe segment, and wherein the first exhaust pipe segment communicates with the third exhaust pipe segment via the second exhaust pipe segment;

the second water inlet cavity further comprises a second water inlet cavity segment provided in the second exhaust pipe segment, and wherein the first water inlet cavity segment communicates with the third water inlet cavity segment via the second water inlet cavity segment;

the second part of the water counterflow cavity further comprises a second water counterflow cavity provided in the second exhaust pipe segment, and wherein the first water counterflow cavity communicates with the third water counterflow cavity via the second water counterflow cavity.

9. The exhaust pipe assembly of claim 8, wherein the second exhaust cavity further comprises a second exhaust cavity segment provided in the second exhaust pipe segment, and wherein the first exhaust cavity segment communicates with the third exhaust cavity segment via the second exhaust cavity segment.

10. The exhaust pipe assembly of claim 8, wherein a first end of the first exhaust pipe segment is hermetically connected to an end of the first exhaust pipe, a second end of the first exhaust pipe segment is hermetically connected to a first end of the second exhaust pipe segment, and a second end of the second exhaust pipe segment is hermetically connected to an end of the third exhaust pipe segment.

11. The exhaust pipe assembly of claim 8, wherein the second exhaust pipe segment is an elbow.

12. An engine, comprising an exhaust pipe assembly, the exhaust pipe assembly comprising:
an exhaust cavity;
an exhaust port, communicating with the exhaust cavity;
at least two air inlets, communicating with the exhaust cavity, wherein the exhaust port is disposed at a first end of the exhaust pipe assembly;
a plurality of water inlets, provided in the same number as the at least two air inlets;
a first water inlet cavity, communicating with a first portion of the water inlets;
a second water inlet cavity, communicating with a second portion of the water inlets;
a water counterflow cavity, communicating with one end of the second water inlet cavity located at the exhaust port of the exhaust pipe assembly; and a water outlet, disposed at a second end of the exhaust pipe assembly;
wherein the first water inlet cavity and the water counterflow cavity each communicate with the water outlet.

13. The engine of claim 12, further comprising a plurality of groups of cylinders, wherein each group of cylinders is connected to the exhaust pipe assembly, wherein the number of cylinders in each group of cylinders is identical as the number of the water inlets or the air inlets, and wherein the water inlets and the air inlets are respectively connected to the cylinders in one-to-one correspondence.

14. The engine of claim 12, wherein the exhaust pipe assembly further comprises a water outlet connector, wherein a second exhaust pipe, a first exhaust pipe, and the water outlet connector are sequentially connected;
the water outlet is provided in the water outlet connector; the first portion of the water inlets and the first water inlet cavity are provided in the first exhaust pipe; the second portion of the water inlets and the second water inlet cavity are provided in the second exhaust pipe; and
the water counterflow cavity comprises a first part of the water counterflow cavity provided in the first exhaust pipe and a second part of the water counterflow cavity provided in the second exhaust pipe, where the first part of the water counterflow cavity communicates with the second part of the water counterflow cavity.

15. The engine of claim 14, wherein the exhaust port is disposed at an end of the second exhaust pipe facing away from the first exhaust pipe; the exhaust cavity comprises a first exhaust cavity provided in the first exhaust pipe and a second exhaust cavity provided in the second exhaust pipe, wherein the first exhaust cavity communicates with the second exhaust cavity, and the exhaust port communicates with the second exhaust cavity;
a first portion of the air inlets are provided in the first exhaust pipe and communicate with the first exhaust cavity, and a second portion of the air inlets are provided in the second exhaust pipe and communicate with the second exhaust cavity, wherein the first portion of the air inlets are provided in the same number as the first portion of the water inlets, and the second portion of the air inlets are provided in the same number as the second portion of the water inlets.

16. The engine of claim 15, wherein a first end of the first exhaust pipe is hermetically connected to an end of the second exhaust pipe, and a second end of the first exhaust pipe is hermetically connected to an end of the water outlet connector.

17. The engine of claim 16, wherein the second exhaust pipe is of an integral structure.

18. The engine of claim 16, wherein the second exhaust pipe comprises a first exhaust pipe segment and a third exhaust pipe segment connected to each other, wherein the first exhaust pipe segment is hermetically connected to the first exhaust pipe;
the second portion of the water inlets are provided in the first exhaust pipe segment; the second water inlet cavity comprises a first water inlet cavity segment provided in the first exhaust pipe segment and a third water inlet cavity segment provided in the third exhaust pipe segment, wherein the second portion of the water inlets each communicate with the first water inlet cavity segment, and the first water inlet cavity segment communicate with the third water inlet cavity segment;
the second part of the water counterflow cavity comprises a first water counterflow cavity provided in the first exhaust pipe segment and a third water counterflow cavity provided in the third exhaust pipe segment, wherein the first water counterflow cavity communicates with the third water counterflow cavity, and the first water counterflow cavity communicates with the first part of the water counterflow cavity; and the third water inlet cavity segment communicates with the third water counterflow cavity at an end of the third exhaust pipe segment facing away from the first exhaust pipe segment.

19. The engine of claim 18, wherein the second portion of the air inlets are provided in the first exhaust pipe segment; the second exhaust cavity comprises a first exhaust cavity segment provided in the first exhaust pipe segment and a third exhaust cavity segment provided in the third exhaust pipe segment, wherein the first exhaust cavity segment communicates with the third exhaust cavity segment, the second portion of the air inlets each communicate with the first exhaust cavity segment, and the first exhaust cavity segment communicates with the first exhaust cavity; and the exhaust port is arranged at the end of the third exhaust pipe segment facing away from the first exhaust pipe segment, and communicates with the third exhaust cavity segment.

20. The engine of claim 19, wherein the second exhaust pipe further comprises a second exhaust pipe segment, and wherein the first exhaust pipe segment communicates with the third exhaust pipe segment via the second exhaust pipe segment;

the second water inlet cavity further comprises a second water inlet cavity segment provided in the second exhaust pipe segment, and wherein the first water inlet cavity segment communicates with the third water inlet cavity segment via the second water inlet cavity segment;

the second part of the water counterflow cavity further comprises a second water counterflow cavity provided in the second exhaust pipe segment, and wherein the first water counterflow cavity communicates with the third water counterflow cavity via the second water counterflow cavity.

* * * * *